United States Patent
Lee et al.

(10) Patent No.: US 8,975,869 B2
(45) Date of Patent: Mar. 10, 2015

(54) PORTABLE TERMINAL BATTERY PACK AND APPARATUS AND METHOD FOR CONTROLLING BATTERY UNIT OF THE BATTERY PACK TO EXTEND BATTERY USE TIME

(75) Inventors: Seongsoo Lee, Seoul (KR); Yongju Jang, Suwon (KR); Sangho Kim, Seoul (KR); JaeHo Lim, Gyeonggi-do (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 593 days.

(21) Appl. No.: 13/315,159

(22) Filed: Dec. 8, 2011

(65) Prior Publication Data

US 2013/0033114 A1  Feb. 7, 2013

(30) Foreign Application Priority Data

Aug. 2, 2011  (KR) .................. 10-2011-0077084

(51) Int. Cl.
*H02J 7/00* (2006.01)

(52) U.S. Cl.
CPC ....... *H02J 7/0063* (2013.01); *H02J 2007/0067* (2013.01); *H02J 7/0024* (2013.01)
USPC .......................................... 320/116; 320/155

(58) Field of Classification Search
CPC ... Y02E 60/12; G01R 31/3658; H02J 7/0021; H02J 7/0016; H02J 7/0045; H02J 7/0044; H02J 7/0042; Y02T 10/7055; H01M 2/1055; H01M 10/46; H01M 10/425; H01M 2/1022

USPC .......................................................... 320/116
See application file for complete search history.

(56) References Cited

U.S. PATENT DOCUMENTS

| | | | | |
|---|---|---|---|---|
| 4,313,078 A * | 1/1982 | Bilsky et al. | .................. | 320/101 |
| 7,304,454 B2 * | 12/2007 | Inui et al. | ....................... | 320/155 |
| 7,535,196 B2 * | 5/2009 | Nagasawa | ...................... | 320/114 |
| 2002/0117996 A1 * | 8/2002 | Cheng | ............................ | 320/114 |
| 2005/0162132 A1 * | 7/2005 | Nagasawa | ...................... | 320/128 |
| 2006/0028179 A1 * | 2/2006 | Yudahira et al. | ............... | 320/133 |
| 2006/0071633 A1 * | 4/2006 | Kubotera et al. | .............. | 320/112 |
| 2007/0035275 A1 * | 2/2007 | Yang et al. | ..................... | 320/112 |
| 2007/0080663 A1 * | 4/2007 | Obering | ......................... | 320/114 |
| 2010/0123436 A1 * | 5/2010 | Herrod et al. | ................. | 320/132 |
| 2012/0126744 A1 * | 5/2012 | Kuroda et al. | ................ | 320/107 |
| 2012/0235641 A1 * | 9/2012 | Yang | .............................. | 320/110 |

FOREIGN PATENT DOCUMENTS

| | | |
|---|---|---|
| JP | 2000-040531A A | 2/2000 |
| JP | 2000-324709A A | 11/2000 |
| KR | 10-2008-0000390 A | 1/2008 |

* cited by examiner

*Primary Examiner* — Arun Williams
(74) *Attorney, Agent, or Firm* — TechLaw LLP

(57) ABSTRACT

Disclosed is a portable terminal, a battery pack and an apparatus for controlling a battery unit. The battery pack includes k battery units, wherein k is an integer of 2 or more; a power supply control unit that conducts control operation such that at least one of the k battery units supplies a power to a load by a time period, and other battery units except for the at least one are in an idle state in a whole or part of the time period.

12 Claims, 9 Drawing Sheets

(A)

(B)

PORTABLE TERMINAL BATTERY PACK AND APPARATUS AND METHOD FOR CONTROLLING BATTERY UNIT OF THE BATTERY PACK TO EXTEND BATTERY USE TIME

CROSS-REFERENCE TO RELATED APPLICATIONS

The present invention claims the benefit of Korean Patent Application No. 10-2011-0077084, filed in Korea on Aug. 2, 2011 which is hereby incorporated by reference for all purposes as if fully set forth herein.

TECHNICAL FIELD

The present invention relates to a portable terminal, a battery pack, and apparatus for controlling a battery unit of a battery pack to extend a battery use time.

BACKGROUND ART

As the use of potable terminals, such as a smart phone, a tablet PC and a portable multimedia player (PDP), increases, a battery use time as a key to the use of the portable terminal along with performance of the portable terminal becomes the important issue. In other words, since the portable terminal cannot use a high-capacity battery due to its portability, a need to develop a technology of extending a battery use time increases.

In this regard, a Korea Patent Application Publication No. 10-2008-0111997 directed to device and method for power-controlling a portable terminal discloses a technology that when supply voltages of battery cells drop around the end of a discharge thereof and discharge currents from battery cells thus increase, connection of the battery cells is changed, thus a magnitude of the supply voltage increases, and thus a battery use time is extended.

The above-described prior art has an object to reduce the discharge currents from the battery cells, but it is problematic that an increase rate of battery use time is not much.

DISCLOSURE

Technical Problem

Accordingly, the present invention is directed to a portable terminal, a battery pack, and apparatus for controlling a battery unit of a battery pack which substantially obviates one or more of the problems due to limitations and disadvantages of the related art.

An advantage of the present invention is to provide a portable terminal, a battery pack, and apparatus for controlling a battery unit of a battery pack that can extend a battery use time.

Additional features and advantages of the present invention will be set forth in the description which follows, and in part will be apparent from the description, or may be learned by practice of the invention. These and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described herein, a battery pack includes: k battery units, wherein k is an integer of 2 or more; a power supply control unit that conducts control operation such that at least one of the k battery units supplies a power to a load by a time period, and other battery units except for the at least one are in an idle state in a whole or part of the time period.

In another aspect, an apparatus for controlling power supply from k battery units to a load includes: a power supply control unit that conducts control operation such that at least one of the k battery units supplies a power to the load by a time period, and other battery units except for the at least one are in an idle state in a whole or part of the time period, wherein k is an integer of 2 or more.

In another aspect, a portable terminal includes: a load unit; m internal battery units, wherein m is an integer of 1 or more; a power terminal connected with n external battery units, wherein n is an integer of 1 or more; a power supply control unit that conducts control operation such that at least one of the m internal and n external battery units supplies a power to the load unit by a time period, and other battery units except for the at least one are in an idle state in a whole or part of the time period.

MODE FOR INVENTION

Reference will now be made in detail to the specific embodiments of the present invention, examples of which are illustrated in the accompanying drawings. Wherever possible, the same or like reference numbers will be used throughout the drawings to refer to the same or like parts. It will be paid attention that detailed description of known arts will be omitted if it is determined that the arts can mislead the present invention.

Figure 1:
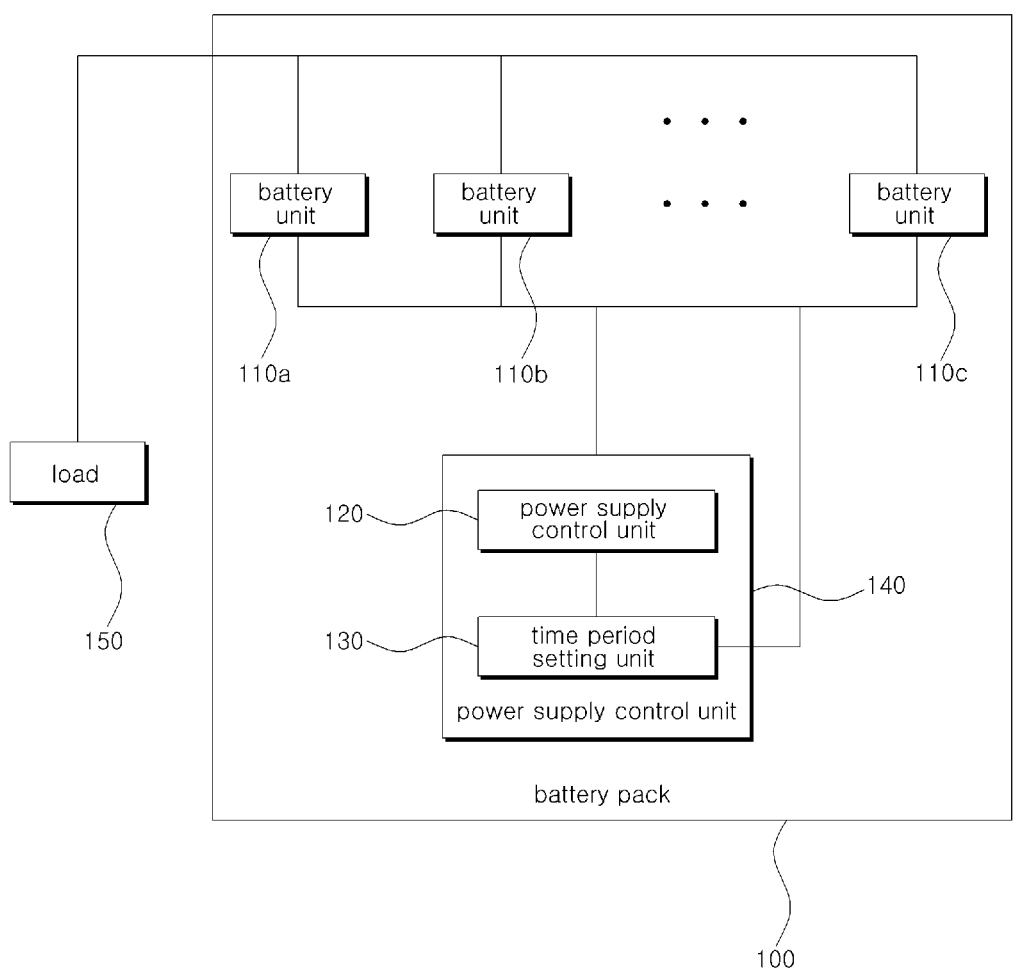
FIGS. 1 and 2 are schematic views illustrating battery packs according to embodiments of the present invention.

FIG. 1 is a schematic view illustrating a battery pack according to an embodiment of the present invention.

Referring to FIG. 1, the battery pack 100 of an embodiment is a device that supplies a power to a portable terminal, and may include k battery units 100, a power supply control unit 120 and a time period setting unit 130, where k is an integer of 2 or more.

The power supply control unit 120 and the time period setting unit 130 may form a power supply control apparatus 140 that is a component separate from the k battery units 110. In this case, the power supply control apparatus 140 may be employed in the portable terminal, and the k battery units 110 may be internal battery units built in the portable terminal or external battery units not built in the portable terminal Detailed explanations of the components of the battery pack 100 are as follows.

The k battery units 110 supply a power to a load 150. The load 150 may be one of all sorts of devices that can be supplied with a power from the battery units 110 and that may be referred to as battery-powered devices. For example, the load 150 may be one of portable terminals, such as a smart phone, a tablet PC, a laptop computer, a PMP and the like.

The battery units 110 may be connected in parallel with the load 150 to supply a power.

Each battery unit 110 may include at least one battery cell. Each battery cell may be a lithium-manganese (Li—Mn) battery cell, a lithium (Li)-Ion battery cell, a nickel-metal hydride (Ni-MH) battery cell, a nickel-cadmium (Ni—Cd) battery cell, a lithium (Li)-Polymer battery cell, or the like.

The at least one battery cell in each battery unit 110 may be connected in series and/or parallel with one another. In this case, for stable power supply to the load 150, the at least one battery cell in each battery unit 110 may be connected such that the k battery units 110 output substantially the same voltage.

The power supply control unit 120 controls the power supply from the battery units 110 to the load 150 by a time period. The time period setting unit 130 sets the time period using at least one of a charge-discharge history of the battery units 110 and an output current magnitude of the battery units 110. In this case, the output current magnitude of the battery units 110 can change in real time, and the time period setting unit 130 can set the time period in real time.

According to a first embodiment of the present invention, the power supply control unit 120 may conduct control operation such that the k battery units 110 alternately supply a power to the load 150 without any power-supply overlaps therebetween. This is for increasing a residual capacity of each battery unit 110 by creating an idle time when the battery unit 110 stops a power supply.

Generally, a battery generates a power by converting a chemical energy of an active material into an electric energy through an electrochemical oxidation-reduction reaction (i.e., the electric energy is generated by an electrolyte reacting between an anode and a cathode and electrons thus moving), and the electrolyte closer to the electrodes reacts earlier and the electrolyte far from the electrodes transfers electrons to the already-reacted electrolyte, which is supplemented. In the case that an idle time, when a power supply stops in supplying a power from the battery, occurs, the electrolyte far from the electrodes can stably transfer electrons to the electrolyte closer to the electrodes and a residual capacity of the battery thus increases, and this is referred to as a battery recovery effect.

In other words, when the k battery units 110 are controlled to alternately supply a power to the load 150 without power-supply overlaps therebetween, a residual capacity of the battery unit 110 in an idle state during an idle time when a power is not supplied increases according to the battery recovery effect, and a use time of the whole battery pack 100 thus increases.

That is, the power supply control unit 120 may control power supply of the k battery units 110 by a time period, and may control the k battery units 110 such that, in each time period, while one of the k battery units 110 supplies a power to the load 150, the (k-1) other battery units 110 are all in an idle state. Accordingly, in each time period, capacities of the (k-1) battery units 110 in an idle state increase.

While the prior art battery pack is configured such that battery units simultaneously output currents to supply a power, the battery pack 100 of an embodiment is configured such that one of the battery units 110 outputs a current to the load 150 during one time period. Accordingly, comparing magnitudes of currents output from one battery units, the magnitude of the current from the battery pack 110 of the embodiment is about double or more of the magnitude of the current from the related art battery pack.

As a current output from a battery increases, a battery use time decreases (that is a use time variation effect according to a rate of discharge). Accordingly, only in consideration of a rate of discharge, a use time of the battery pack 100 of the embodiment may be shorter than that of the prior art battery pack.

However, an increase amount of battery use time according to a battery recovery effect is much greater than a decrease amount of battery use time according to increase of a discharge rate. Accordingly, a use time of the battery pack 100 of the embodiment is longer than that of the prior art battery pack that has the same structure and state as the battery pack 100 of the embodiment.

Further, according to the embodiment, the power supply control unit 120 may conduct control operation such that the respective battery units 110 which supply a power to the load 150 during consecutive k time periods are different. In other words, the power supply control unit 120 may conduct control operation such that the k battery units 110 sequentially supply a power to the load 150 without power-supply overlaps.

For example, assuming that a number of the battery units 110 is k=3, the power supply control unit 120 may set a power supply sequence of the 3 battery units 110 like a way, "a first battery unit→a second battery unit→a third battery unit→the first battery unit→the second battery unit→ . . . "

Figure 2:
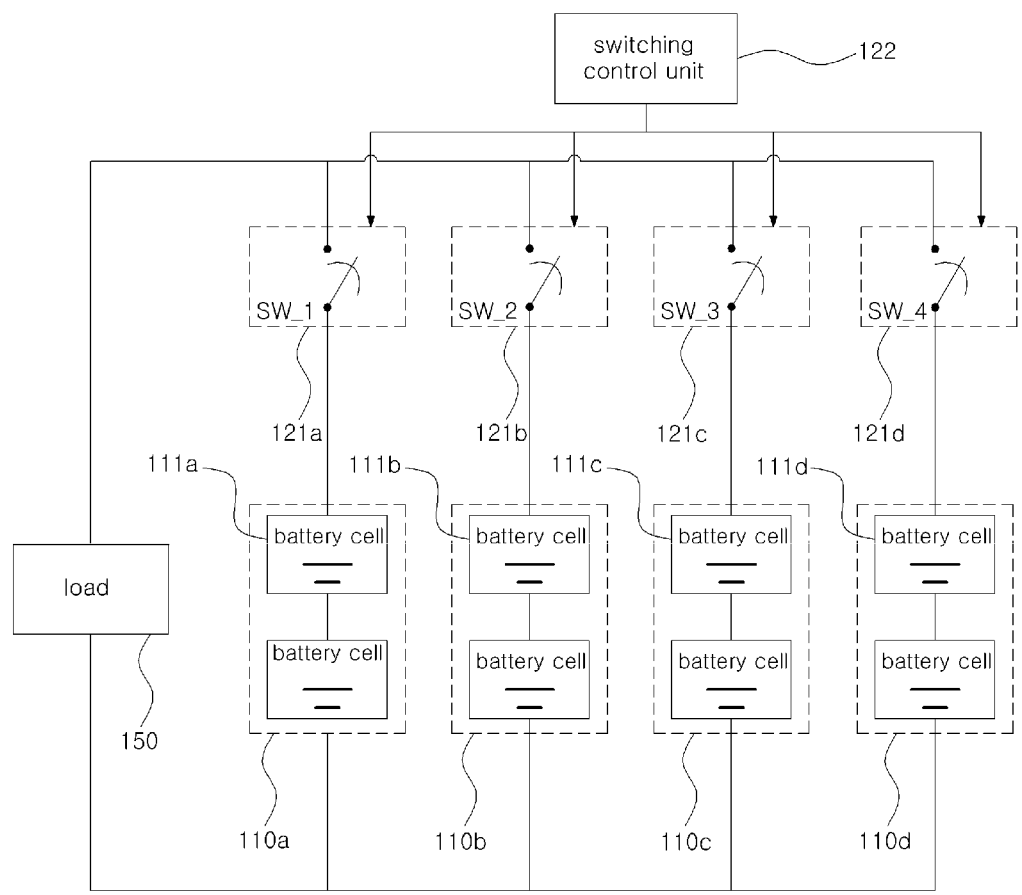

Further, according to another embodiment, when the k battery units 110 are connected in parallel with the load 150, the power supply control unit 120 may include k switching elements (121 of FIG. 2) connected between the respective battery units 110 and the load 150, and a switching control unit (122 of FIG. 2) that controls turn-on/off of the k switching elements 121. FIG. 2 shows an example of a battery pack 100 in which a number of the battery units 110 and a number of the switching elements 121 each are k=4, and each battery unit 110 includes 2 battery cells 111 connected in series with each other.

Figure 3:
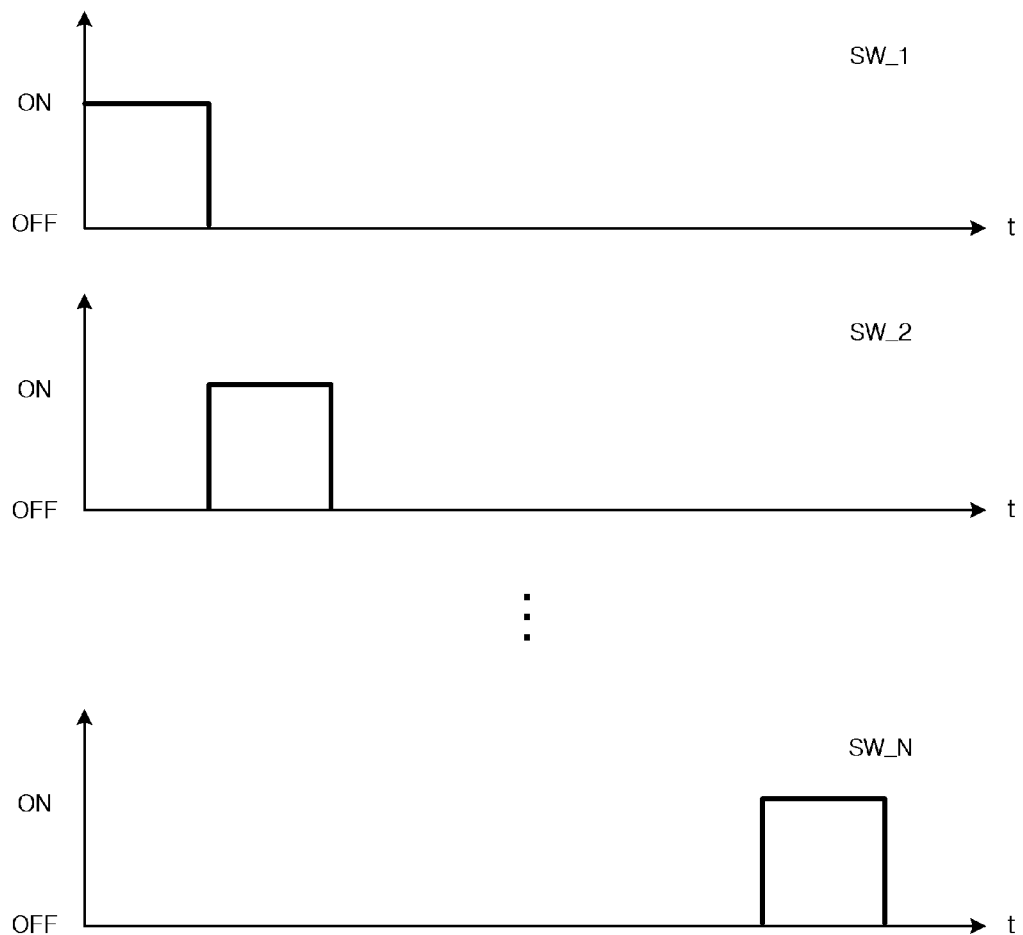
FIG. 3 is a view illustrating an example of switching signals generated by a switching control unit according to an embodiment of the present invention.
Figure 4:
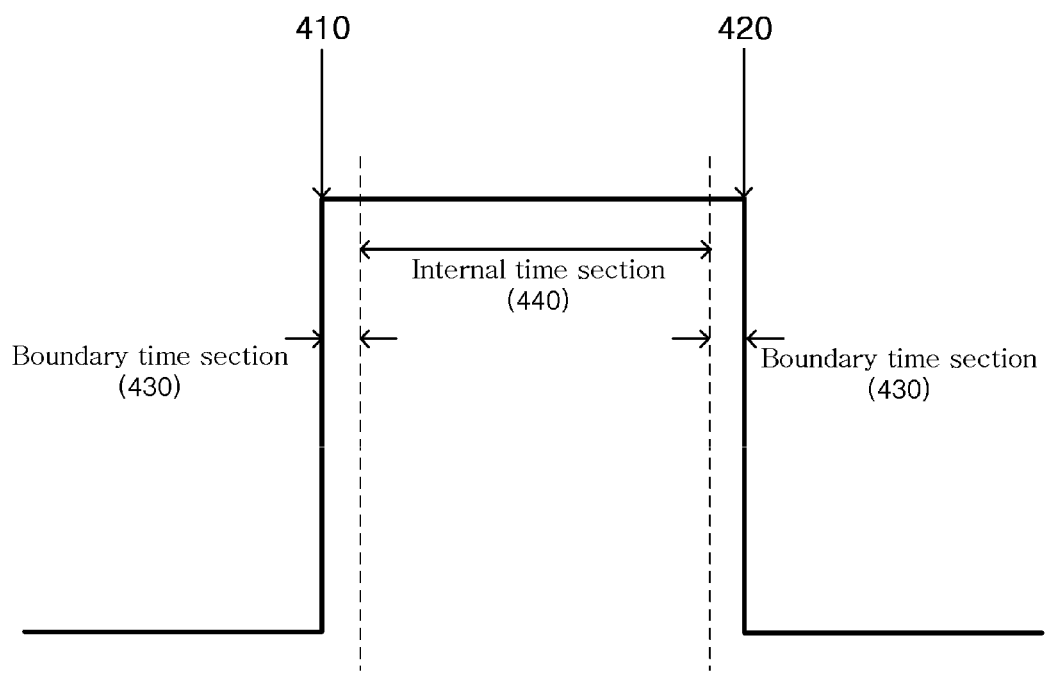
FIG. 4 is a view illustrating conceptual configuration of a time period according to an embodiment of the present invention.

In this case, in each time period, the switching control unit 122 may turn on the switching element 121 that is connected to one of the battery units 110 supposed to supply a power to the load 150, and turn off the other switching elements 121 connected to the (k-1) other battery units 110. For example, the switching control unit 122 may control turn-on/off of the k switching elements 121 by k time periods using switching control signals as shown in FIG. 3. The k switching signals are repeated by k time periods.

According to a second embodiment of the present invention, when the k battery units 110 are connected in parallel with the load 150, the power supply control unit 120 may conduct control operation such that a battery unit 110 for supplying a power in a previous time period and another battery unit 110 for supplying a power in a current time period supply a power simultaneously in a very short time section.

This is for stably supplying a power at a time when one of the battery units is changed with another one of the battery units.

To do this, the time period may include a boundary time section 430 having a time interval from a start point or an end point 410 or 420 of the time period, and an internal time section 440 except for the boundary time section 430. The boundary time section 430 is very much shorter than the internal time section 440. In this case, the power supply control unit 120 may control the k battery units 110 such that, in the internal time section 440, one of the k battery units 110 supplies a power to the load 150 while the (k-1) other battery units 110 are in an idle state, and, in the boundary time section 430, 2 battery units 110 including the one of the k battery units 110 that supplies a power in the internal time section 440 supply a power to the load 150 together while the (k-2) other battery units 110 are in an idle state.

Accordingly, the battery units 110 are controlled such that, in the internal time section 440, the other battery units except for one of the battery units supplying a power to the load 150 are in an idle state, and, in the boundary time section 430, a part of the other battery units except the one of the battery units is in an idle state.

In the boundary time section 430 including the start point 410, a battery unit that supplied a power to the load 150 in the internal time section 440 of a previous time period and a battery unit that is supplying a power to the load in the internal time section 440 of a current time period may simultaneously supply a power to the load 150. Further, in the boundary time section 430 including the end point 420, a battery unit that supplied a power to the load 150 in the internal time section 440 of a current time period and a battery unit that will supply a power to the load in the internal time section 440 of a next time period may simultaneously supply a power to the load 150.

Further, in this embodiment, the power supply control unit 120 may conduct control operation such that the respective battery units 110 which supply a power to the load 150 during internal time sections 440 of consecutive k time periods are different.

Figure 5:
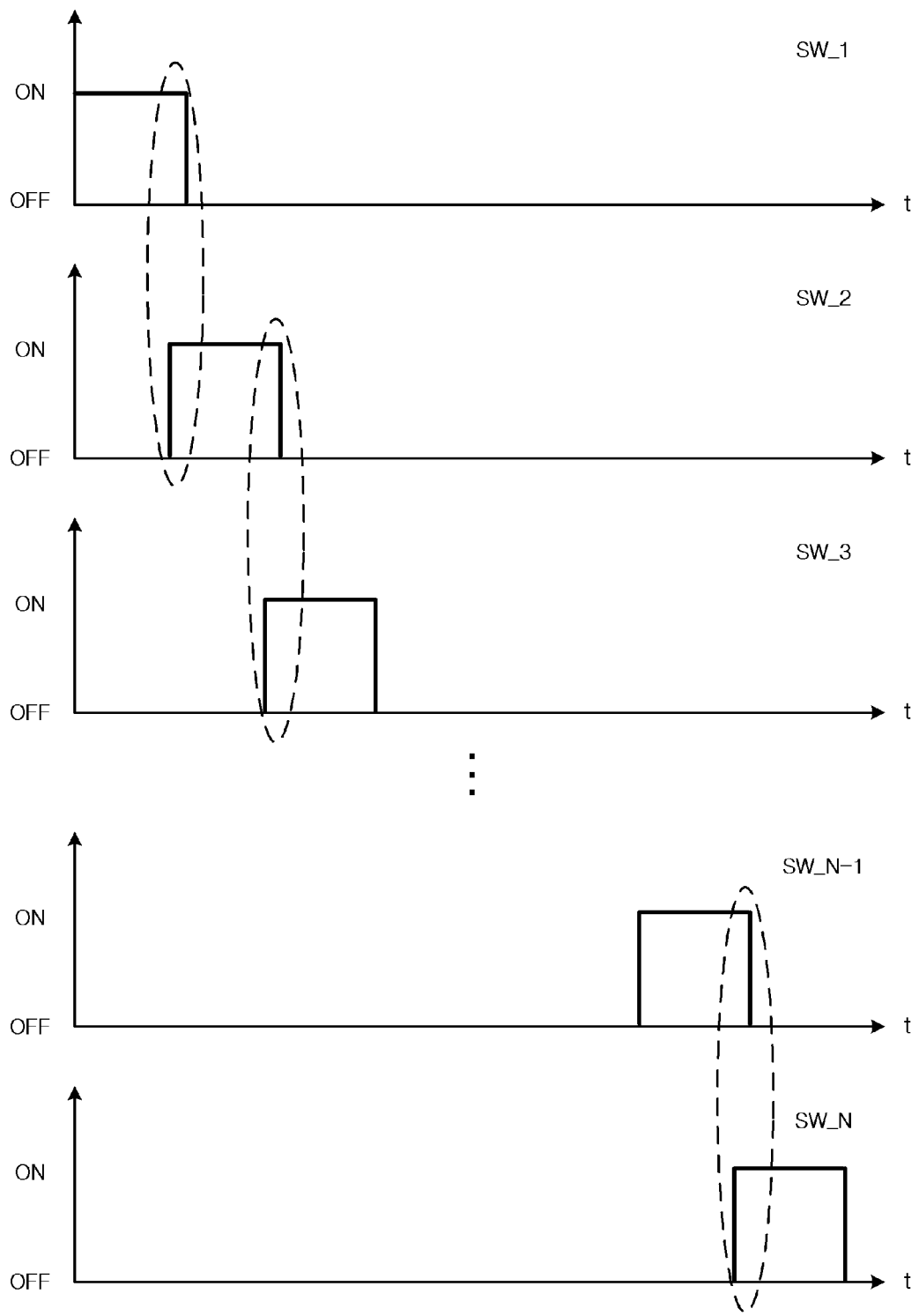
FIG. 5 is a view illustrating another example of switching signals generated by a switching control unit according to an embodiment of the present invention.

Further, when the battery pack 100 is configured as shown in FIG. 2, in the internal time section 440 of each time period, the switching control unit 122 may turn on the switching element 121 that is connected to one of the battery units 110, and turn off the other switching elements 121 connected to the (k-1) other battery units 110. In the boundary time section 430 of each time period, the switching control unit 122 may turn on the switching elements 121 that are connected to the 2 battery units 110, and turn off the switching elements 121 connected to the (k-2) other battery units 110. For example, the switching control unit 122 may control turn-on/off of the k switching elements 121 using switching control signals as shown in FIG. 5. The k switching signals are repeated by k time periods.

To sum up the above-described first and second embodiments, the power supply control unit 120 conduct control operation such that, in a whole or part of a time period, one of the k battery units 110 supplies a power to the load 150 while the (k-1) other battery units 110 are in an idle state. As such, in the above embodiments, it is explained that the power supply control unit 120 conduct control operation such that one battery unit supply a power to the load 150 in a whole or part of one time period. However, it should be understood that, according to another embodiment, two or more battery units may supply a power to the load 150 in one time period i.e., a whole or part of one time period.

In other words, the power supply control unit 120 may conduct control operation such that at least one of the k battery units 110 supplies a power to the load 150 by a time period, and, in a whole or part of the time period, the other battery units 110 except for the at least one are in an idle state. Accordingly, the phrase "one of the battery units 110 supplying a power" or the like used in the above-described embodiments may be replaced with a phrase "at least one of the battery units 110 supplying a power".

Figure 6:
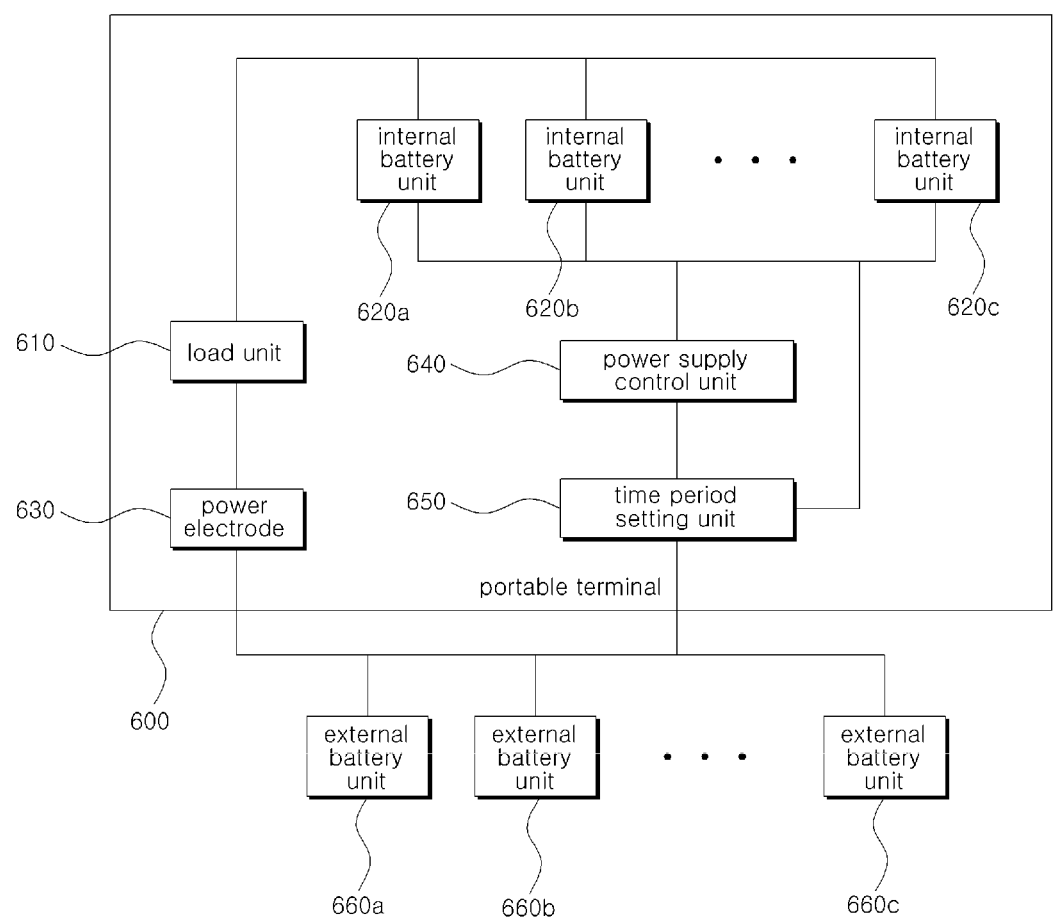
FIG. 6 is a schematic view illustrating a portable terminal according to embodiments of the present invention.

FIG. 6 is a view illustrating a portable terminal according to another embodiment of the present invention.

Referring to FIG. 6, the portable terminal 600 may include a load unit 610, m internal battery units 620, a power electrode 630, a power supply control unit 640, a time period setting unit 650, where m is an integer of 1 or more. Detailed explanations of the components of the portable terminal 600 are as follows.

The m internal battery units 620 are battery units built in the portable terminal 600, and the power electrode 360 is connected to n external battery units 660, where n is an integer of 1 or more. Accordingly, the load unit 610 is supplied with a power from at least one battery unit of the m internal battery units 620 and the n external battery units 660.

The power supply control unit 640 conducts control operation such that at least one of the m internal battery units 620 and the m external battery units 660 supplies a power to the load unit 610 by a time period, and, in a whole of part of the time period, the other battery units except for the at least one are in an idle state. The time period setting unit 650 sets the time period to control power supply operation of the m internal battery units 620 and the n external battery units 660.

In other words, the power supply control unit 640 conduct power supply control operation for the m internal battery units 620 and the n external battery units 660 according to the manner explained above with reference to FIGS. 1 to 5.

Accordingly, according to this embodiment, when the time period includes an internal time section and a boundary time section, the power supply control unit 640 may conduct control operation such that, in the internal time section, the other battery units except for the at least one are in an idle state, and, in the boundary time section, a part of the other battery units except for the at least one is in an idle state.

Further, according to this embodiment, when the m internal battery units 620 and the n external battery units 660 are connected in parallel with the load unit 610, the power supply control unit 640 may include (m+n) switching elements connected between the respective ones of the m internal battery units 620 and the n external battery units 660 and the load unit 610, and a switching control unit controlling turn-on/off of the (m+n) switching elements. In this case, the switching control unit may turn off the switching elements connected with the other battery units except for the at least one in a whole or part of the time period.

A use time extension efficiency of the battery pack 100 according to the embodiment of the present invention is explained in detail with reference to FIGS. 7 and 8.

Figure 7:
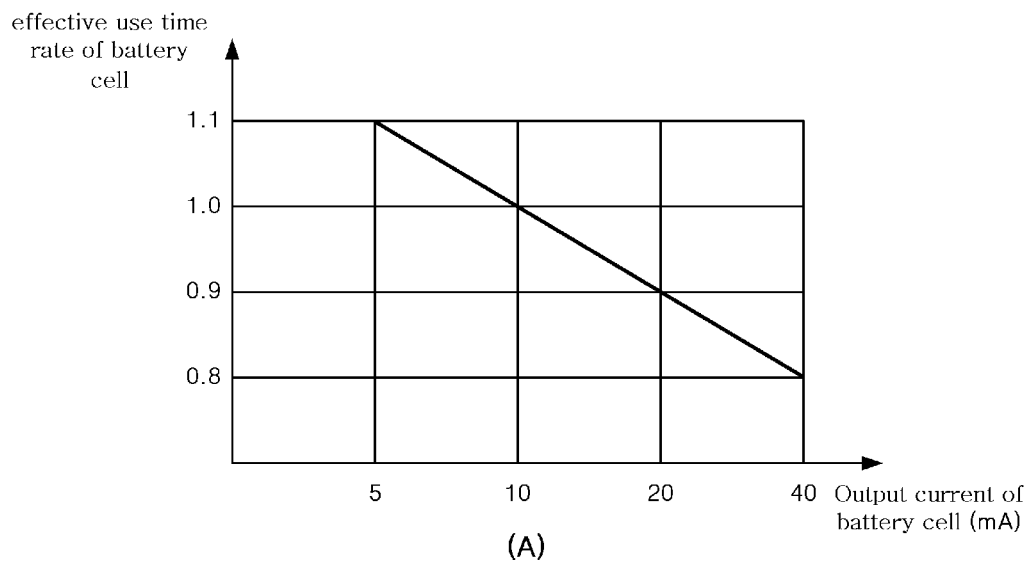
FIG. 7 is a view illustrating a use time variation model of a battery cell according to a discharge rate, and a use time variation model of a battery cell according to a battery recovery effect.
Figure 7:
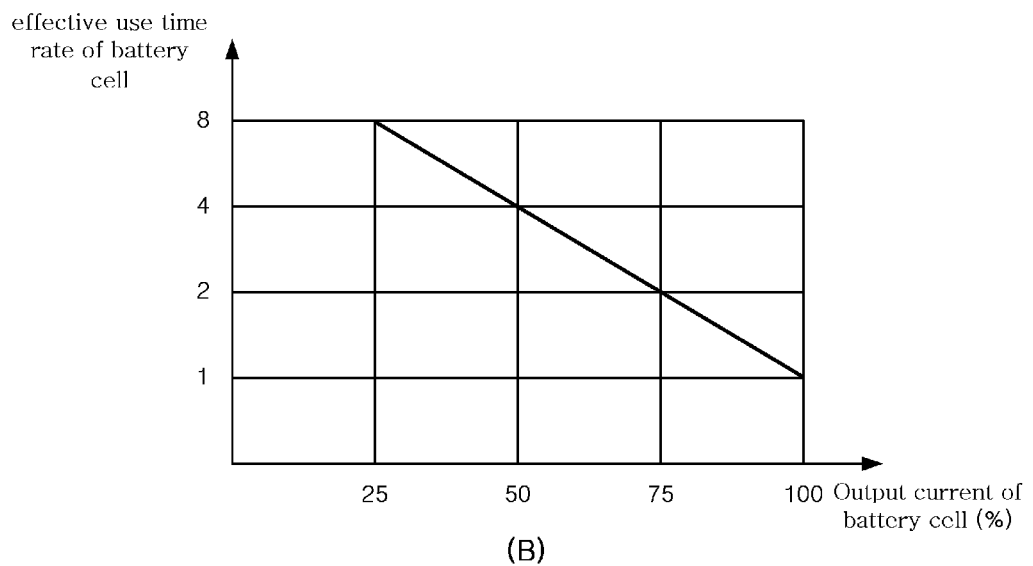
Figure 8:
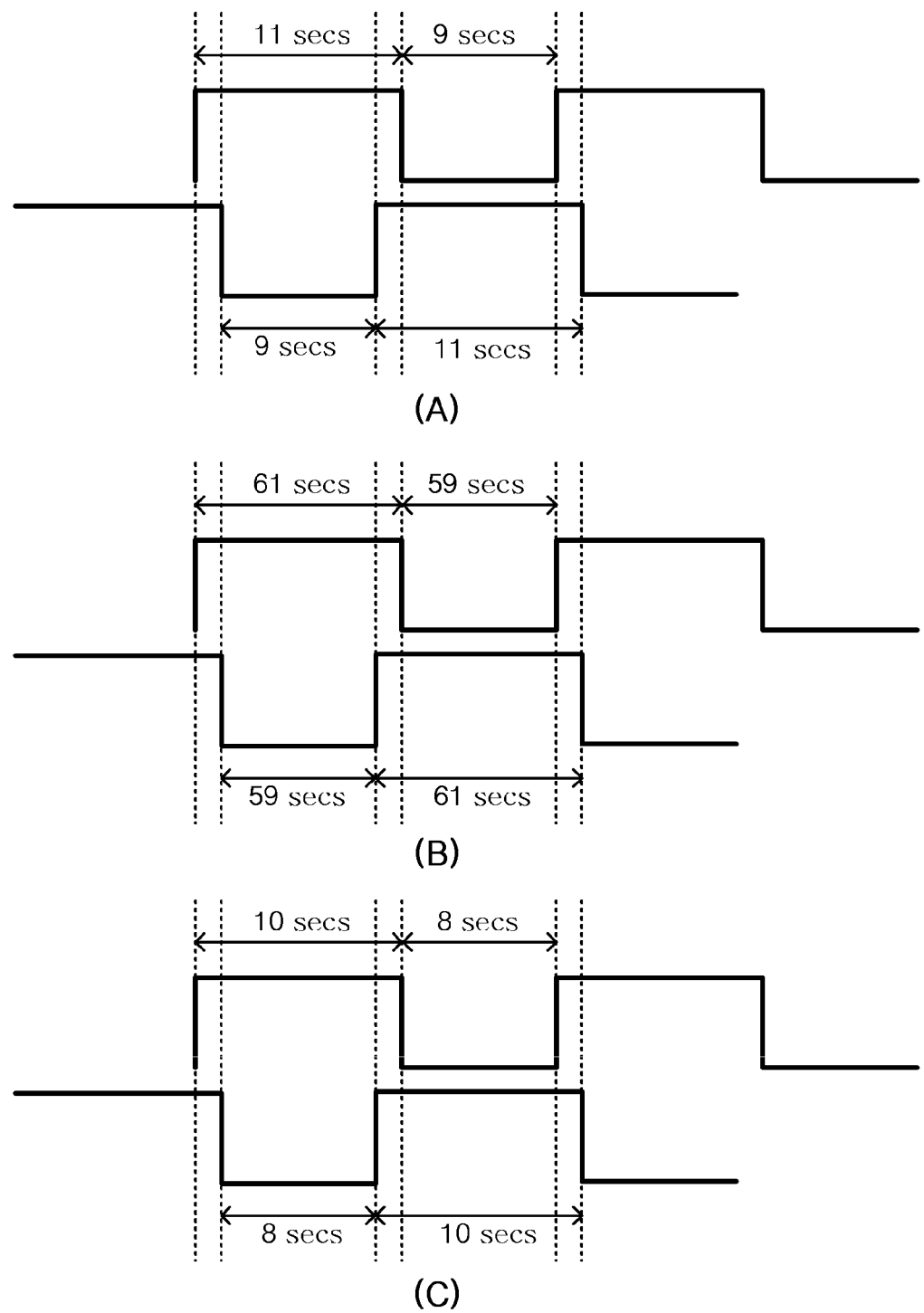
FIG. 8 is a view illustrating a detailed example of switching signals generated by a switching control unit according to an embodiment of the present invention.

FIG. 7 shows an effective use time variation model of a battery cell according to a discharge rate in FIG. 7(A), and an effective use time variation model of a battery cell according to a battery recovery effect in FIG. 7(B).

First, a use time variation of battery cell according to a discharge rate may be approximated in the way that when an output current of a battery cell is varied in an exponential form, an effective use time of a battery cell is varied in a linear form. Accordingly, as shown in FIG. 7(A), the use time variation model according to a discharge rate may be approximated in the wary that as an output current of a battery cell increases, a use time rate of a battery cell (R1, that is referred to as a first use rate) decreases in a linear form.

Then, a use time variation of a battery cell according to a battery recovery effect may be approximated in the way that when a use rate of a battery cell is varied in a linear form, an effective use time of a battery cell is varied in an exponential form. As an example with respect to the use rate of a battery cell, when a battery cell is used continuously for a specific time, a use rate of a battery cell is 100%, and when a battery cell is used for a half of a specific time and is not used for another half of the specific time, a use rate of a battery cell is 50%. Accordingly, as shown in FIG. 7(B), the use time variation model according to a battery recovery effect may be approximated in the wary that as a use rate of a battery cell increases, a use time rate of a battery cell (R2, that is referred to as a second use rate) decreases in a linear form.

Accordingly, a final use time rate (R) may be defined as a multiplication of the first use rate by the second use rate (R1*R2).

Based on the above description, a use time extension efficiency of the battery pack 100 and the portable terminal 600 is explained in detail as follows.

1. FIRST EXAMPLE

The Case of the Battery Pack 100 Including 2 Battery Units 110 Connected in Parallel Assuming that a voltage applied to the load 150 is 8.4V and a current input into the load 150 is 20 mA, in the case that 2 switching elements 121 repeatedly alternate in turn-on/off by a time period with turn-on/off overlap for a negligibly very short time, a current is output from one of the 2 battery units 110 in each time period. Accordingly, among currents from the battery units 110, a magnitude of a current from one of the battery units 110 is 20 mA while a magnitude of a current from the other of the battery units 110 is 0 mA.

Therefore, compared to the prior art battery pack in which 2 battery units are simply connected in parallel, a magnitude of a current from each of the 2 battery units increases by double (because a magnitude of a current from each of the prior art 2 battery units is 10 mA), and use rates of the 2 battery units decrease by double.

When this case is applied to the use time variation model of a battery cell according to a discharge rate and the use time variation model of a battery cell according to a battery recovery effect shown in FIG. 7, a first use rate is 0.9 and a second use rate is 4, and a final use time rate is thus 3.6 (=0.9*4).

In comparison, in the prior art battery pack, a first use rate and a second use rate are each 1, and a final use time rate is thus 1 (=1*1).

Therefore, in the first example, the use time of the battery pack 100 of the embodiment increases by about 3.6 times compared to the prior art.

2. SECOND EXAMPLE

The Case of the Battery Pack 100 Including 4 Battery Units 110 Connected in Parallel Assuming that a voltage applied to the load 150 is 8.4V and a current input into the load 150 is 20 mA, in the case that 4 switching elements 121 repeatedly alternate in turn-on/off by a time period with turn-on/off overlap for a negligibly very short time, a current is output from one of the 4 battery units 110 in each time period. Accordingly, among currents from the battery units 110, a magnitude of a current from one of the battery units 110 is 20 mA while magnitudes of currents from the others of the battery units 110 are 0 mA.

Therefore, compared to the prior art battery pack in which 4 battery units are simply connected in parallel, a magnitude of a current from each of the 4 battery units increases by 4 times (because a magnitude of a current from each of the prior art 4 battery units is 5 mA), and use rates of the 4 battery units decrease by 4 times.

When this case is applied to the use time variation model of a battery cell according to a discharge rate and the use time variation model of a battery cell according to a battery recovery effect shown in FIG. 7, a first use rate is 0.9 and a second use rate is 8, and a final use time rate is thus 7.2 (=0.9*8).

In comparison, in the prior art battery pack, a first use rate is 1.1 and a second use rate is 1, and a final use time rate is thus 1.1 (=1.1*1).

Therefore, in the second example, the use time of the battery pack 100 of the embodiment increases by about 6.55 times compared to the prior art.

3. THIRD EXAMPLE

The Case of the Battery Pack 100 Including 2 Battery Units 110 Connected in Parallel and Each Battery Unit 110 Including Four 1.2V Ni—Cd Battery Cells Connected in Series When the load 150 is "ACHRO-HD" of a table PC that is driven with a minimum driving voltage of 3.3V, each battery unit 110 supplies a power until a magnitude of an output voltage changes from 4.8V to 3.3V, and 2 switching elements 121 are mechanical relay switches and are repeatedly turned on/off as shown in FIGS. 8(A) and (B), actually measured average use times of battery packs are shown in a following Table 1.

TABLE 1

|  | average use time (sec) | use time rate (%) |
|---|---|---|
| Prior art battery pack | 4776 | 100 |
| Battery pack of FIG. 8(A) | 6240 | 130.7 |
| Battery pack of FIG. 8(B) | 5517 | 115.5 |

Even though this test is performed in circumstances not optimized for experiment using mechanical relay switches causing great loss of power, referring to Table 1, it is shown that use times of the battery packs 100 of the embodiment extend by about 30.7% and 15.5% compared to the prior art.

4. FOURTH EXAMPLE

The Case of the Battery Pack 100 Including 2 Battery Units 110 Connected in Parallel and Each Battery Unit 110 Including One 4.2V Li-Polymer Battery Cell When the load 150 is "ACHRO-HD" of a table PC that is driven with a minimum driving voltage of 3.5V, each battery unit 110 supplies a power until a magnitude of a output voltage changes from 4.2V to 3.3V, and 2 switching elements 121 are mechanical relay switches and are repeatedly turned on/off as shown in FIG. 8(C), actually measured average use times of battery packs are shown in a following Table 2.

TABLE 2

| | average use time (sec) | use time rate (%) |
|---|---|---|
| Prior art battery pack | 2990 | 100 |
| Battery pack of FIG. 8(C) | 3629 | 121.4 |

Even though this test is performed in circumstances not optimized for experiment using mechanical relay switches causing great loss of power, referring to Table 2, it is shown that an use time of the battery pack 100 of the embodiment extends by about 21.4% compared to the prior art.

Figure 9:
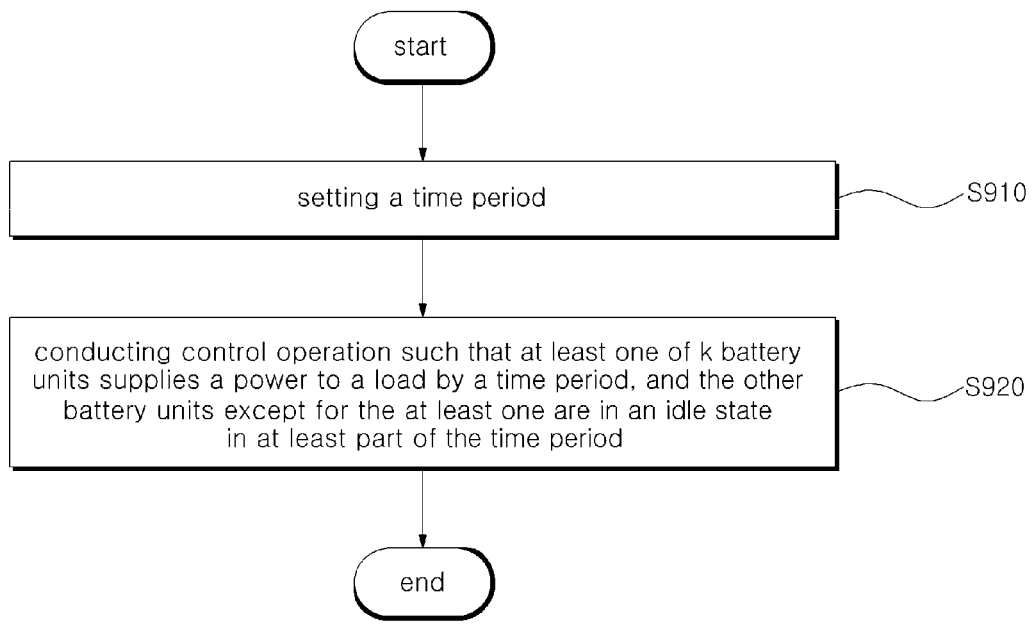
FIG. 9 is a flow chart illustrating a method of controlling battery units according to an embodiment of the present invention.

FIG. 9 is a flow chart illustrating a method of controlling battery units according to another embodiment of the present invention.

The method of controlling battery units according to the embodiment of the present invention is applicable to control power supply operation of a battery pack including k battery units. Processes performed in each step are explained as follows.

First, in a step S910, a time period for power supply control for k battery units is set.

According to the embodiment, in the step S910, the time period may be set using at least one of a charge-discharge history of the k battery units and an output current magnitude from the k battery units.

Then, in a step S920, control operation is conducted such that at least one of k battery units supplies a power to a load by the time period, and the other battery units except for the at least one are in an idle state in a whole or part of the time period.

According to the embodiment, the time period may include a boundary time section having a time interval from a start point or an end point of the time period, and an internal time section except for the boundary time section. In this case, in the step S920, control operation may be conducted such that the other battery units except for the at least one are in an idle state in the internal time section, and a part of the other battery units except for the least one is in an idle state in the boundary time section.

In this embodiment, the power supply control method for the battery units is explained. Configuration of the power supply control apparatus 140 of FIG. 1 is applicable to this embodiment, and detailed explanations thereof are omitted.

Further, the embodiments of the present invention may be realized in form of program instruction that can be performed through various computer means, and be recorded on computer-readable media. The computer-readable media may include program instruction, data file, data structure and the like, singly or in combination. The program instruction recorded on the media may be one designed and configured specially for the present invention or one know to and usable by one of ordinary skill in the computer software art. The computer-readable recording media may include, for example, magnetic media such as hard disk, floppy disk and magnetic tape, optical media such as CD-ROM and DVD, magneto-optical media such as floptical disk, ROM, RAM, flash memory or the like. The program instruction may include, for example, a machine language code like one that is generated by a compiler, or a high-level language code that is executed by a computer using an interpreter or the like. The aforementioned hardware device may be configured to be operated as at least one software module to execute operations of the embodiments of the present invention, and vise versa.

As described above, according to the present invention, a battery use time of the battery pack and the portable terminal using the same can be extended.

Further, since the battery use time increases, battery charge cycles can be reduced, and lifetime of the battery pack and using the same can thus be extended.

Further, the battery pack can become small-sized and light-weight supplying the same power, and the portable terminal including the battery pack can become small-sized and light-weight.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A battery pack, comprising:
   k battery units, wherein k is an integer of 2 or more;
   a power supply control unit that conducts control operation such that at least one of the k battery units supplies a power to a load by a time period, and other battery units except for the at least one are in an idle state in a whole or part of the time period,
   wherein the time period includes a boundary time section having a time interval from a start point or an end point of the time period, and an internal time section except for the boundary time section, and wherein the power supply control unit conducts control operation such that the other battery units except for the at least one are in an idle state in the internal time section and a part of the other battery units except for the at least one is in an idle state in the boundary time section.

2. The battery pack according to claim 1, wherein the power supply control unit conducts control operation such that, in the whole or part of the time period, one of the k battery units supplies a power to the load and other battery units except for the one are in an idle state, and ones of the k battery units supplying a power to the load in consecutive k time periods, respectively, are different.

3. The battery pack according to claim 1, wherein the k battery units are connected in parallel with the load, wherein the power supply control unit includes k switching elements connected between the k battery units, respectively, and the load, and a switching control unit that controls turn-on/off of the k switching elements, and wherein the switching control unit turns off the switching elements connected with the other battery units except for the at least one in the whole or part of the time period.

4. The battery pack according to claim 1, wherein the k battery units have the same output voltage.

5. The battery pack according to claim 4, wherein the k battery units each have at least one battery cell, and wherein the at least one battery cell are connected in series, in parallel, or in series and parallel.

6. The battery pack according to claim 1, further comprising a time period setting unit that sets the time period using at least one of a charge-discharge history of the k battery units and a magnitude of output current of the k battery units.

7. An apparatus for controlling power supply from k battery units to a load, the apparatus comprising:
   a power supply control unit that conducts control operation such that at least one of the k battery units supplies a power to the load by a time period, and other battery units except for the at least one are in an idle state in a whole or part of the time period, wherein k is an integer of 2 or more, and wherein the time period includes a boundary time section having a time interval from a start point or an end point of the time period, and an internal time section except for the boundary time section, and wherein the power supply control unit conducts control operation such that the other battery units except for the at least one are in an idle state in the internal time section and a part of the other battery units except for the at least one is in an idle state in the boundary time section.

8. The apparatus according to claim 7, wherein the k battery units are connected in parallel with the load, wherein the power supply control unit includes k switching elements connected between the k battery units, respectively, and the load, and a switching control unit that controls turn-on/off of the k switching elements, and wherein the switching control unit turns off the switching elements connected with the other battery units except for the at least one in the whole or part of the time period.

9. The apparatus according to claim 7, further comprising a time period setting unit that sets the time period using at least one of a charge-discharge history of the k battery units and a magnitude of output current of the k battery units.

10. A portable terminal, comprising:
a load unit;
m internal battery units, wherein m is an integer of 1 or more;
a power terminal connected with n external battery units, wherein n is an integer of 1 or more; and
a power supply control unit that conducts control operation such that at least one of the m internal and n external battery units supplies a power to the load unit by a time period, and other battery units except for the at least one are in an idle state in a whole or part of the time period, wherein the time period includes a boundary time section having a time interval from a start point or an end point of the time period, and an internal time section except for the boundary time section, and wherein the power supply control unit conducts control operation such that the other battery units except for the at least one are in an idle state in the internal time section and a part of the other battery units except for the at least one is in an idle state in the boundary time section.

11. The portable terminal according to claim 10, wherein the m internal and n external battery units are connected in parallel with the load unit, wherein the power supply control unit includes (m+n) switching elements connected between the m internal and n external battery units, respectively, and the load unit, and a switching control unit that controls turn-on/off of the (m+n) switching elements, and wherein the switching control unit turns off the switching elements connected with the other battery units except for the at least one in the whole or part of the time period.

12. The portable terminal according to claim 10, further comprising a time period setting unit that sets the time period using at least one of a charge-discharge history of the m internal and n external battery units and a magnitude of output current of the m internal and n external battery units.

* * * * *